United States Patent
Sundermann et al.

(10) Patent No.: US 11,820,621 B2
(45) Date of Patent: Nov. 21, 2023

(54) SEPARATION DEVICE FOR SEPARATING A TUBULAR FLAT MATERIAL, SYSTEM AND SEPARATING METHOD

(71) Applicant: Windmöller & Hölscher KG, Lengerich (DE)

(72) Inventors: Fabian Sundermann, Lengerich (DE); Thomas Sehlleier, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 16/340,955

(22) PCT Filed: Oct. 11, 2017

(86) PCT No.: PCT/EP2017/075959
§ 371 (c)(1),
(2) Date: Apr. 10, 2019

(87) PCT Pub. No.: WO2018/069402
PCT Pub. Date: Apr. 19, 2018

(65) Prior Publication Data
US 2019/0233243 A1    Aug. 1, 2019

(30) Foreign Application Priority Data

Oct. 11, 2016    (DE) .................... 10 2016 119 281.3

(51) Int. Cl.
*B65H 35/00*    (2006.01)
*B65H 35/02*    (2006.01)
(Continued)

(52) U.S. Cl.
CPC ......... *B65H 35/0086* (2013.01); *B26D 1/035* (2013.01); *B26D 3/001* (2013.01);
(Continued)

(58) Field of Classification Search
CPC . B26D 1/035; B26D 5/32; B26D 5/34; B26D 5/04; B26D 3/001; B26D 11/00;
(Continued)

(56) References Cited

U.S. PATENT DOCUMENTS 3,762,250 A * 10/1973 Huskey .................... D06H 7/02
83/27
4,031,790 A *  6/1977 Arvidsson ................ B27B 5/34
83/425.2
(Continued)

FOREIGN PATENT DOCUMENTS

DE        4108717 A1 *  3/1991
EP        0169962 A1 *  2/1986
(Continued)

OTHER PUBLICATIONS

DE 4108717A1, Translation (Year: 2023).*
EP 0169962A1, Translation (Year: 2023).*

*Primary Examiner* — Nhat Chieu Q Do
(74) *Attorney, Agent, or Firm* — Peter W. Schroen; Bret E. Field; Bozicevic, Field & Francis LLP

(57) ABSTRACT

A separating device (10) for separating a tubular flat material (1) having an actual tube width (1.1), comprising at least one longitudinal separating unit (20) for removing a first edge region (2) and a second edge region (3) of the flat material (1) is provided. In addition, a separating method (100) for separating a tubular flat material and to a system (70) having a separating device (10) is provided.

17 Claims, 4 Drawing Sheets

Figure 1:
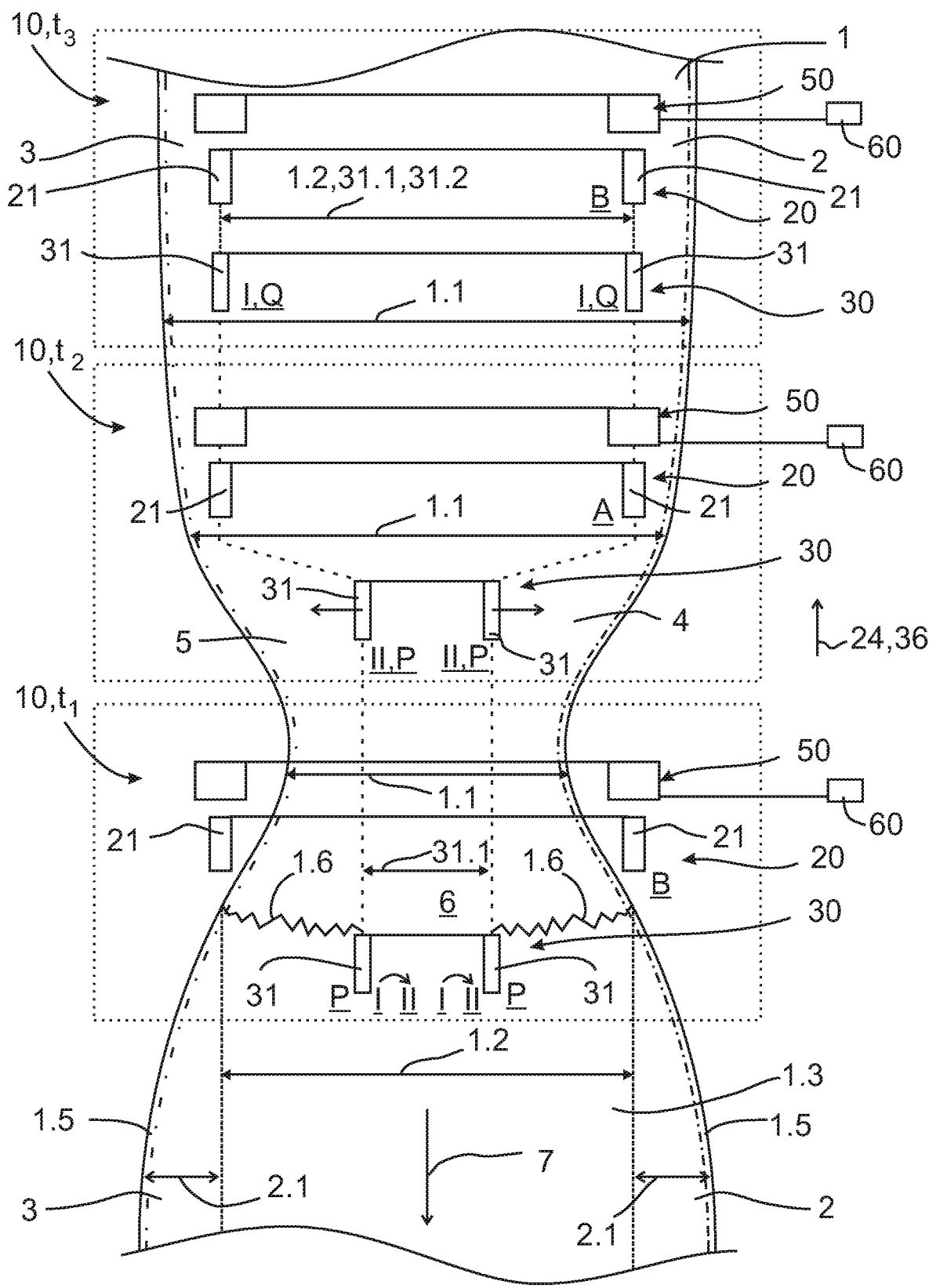

(51) Int. Cl.
   *B29C 48/92*    (2019.01)
   *B29C 48/10*    (2019.01)
   *B29C 48/00*    (2019.01)
   *B26D 3/00*     (2006.01)
   *B26D 11/00*    (2006.01)
   *B26D 5/04*     (2006.01)
   *B26F 3/00*     (2006.01)
   *B26D 1/03*     (2006.01)
   *B26D 5/32*     (2006.01)
   *B26D 5/34*     (2006.01)
   *B29C 48/28*    (2019.01)
   *B65H 18/08*    (2006.01)
   *B65H 43/08*    (2006.01)
   *B23K 26/38*    (2014.01)

(52) U.S. Cl.
   CPC ............ *B26D 5/04* (2013.01); *B26D 5/32* (2013.01); *B26D 5/34* (2013.01); *B26D 11/00* (2013.01); *B26F 3/004* (2013.01); *B29C 48/0018* (2019.02); *B29C 48/0022* (2019.02); *B29C 48/10* (2019.02); *B29C 48/28* (2019.02); *B29C 48/92* (2019.02); *B65H 18/08* (2013.01); *B65H 35/02* (2013.01); *B65H 43/08* (2013.01); *B23K 26/38* (2013.01); *B29C 2793/0063* (2013.01); *B65H 2301/41487* (2013.01); *B65H 2511/12* (2013.01); *B65H 2701/11214* (2013.01); *B65H 2701/1752* (2013.01)

(58) Field of Classification Search
   CPC .... B65H 43/08; B65H 35/02; B65H 35/0086; B65H 2701/1752; B65H 2301/41487; B65H 2511/12; B65H 2701/11214; B65H 23/26; B65H 2301/71787; B29C 48/0018; B29C 48/28; B29C 48/92; B29C 48/10; B29C 48/0022; B29C 2793/0063; B23K 26/38
   USPC ............ 83/425.2–425.4; 493/475, 366
   See application file for complete search history.

(56) References Cited

U.S. PATENT DOCUMENTS

| | | | | |
|---|---|---|---|---|
| 4,537,582 A * | 8/1985 | Liu | ............ | B26D 1/035 493/369 |
| 4,831,909 A * | 5/1989 | Peters | ............ | B26D 1/035 83/425.4 |
| 4,960,023 A * | 10/1990 | Reuter | ............ | B23D 47/02 83/508.3 |
| 5,142,955 A * | 9/1992 | Hale | ............ | B27B 5/228 83/368 |
| 5,367,931 A * | 11/1994 | Kitamura | ............ | B23D 19/08 83/407 |
| 5,496,431 A * | 3/1996 | Hirakawa | ............ | B26D 7/2628 156/271 |
| 6,092,452 A * | 7/2000 | Adami | ............ | B26D 11/00 83/425.2 |
| 6,103,171 A * | 8/2000 | Cummings | ............ | B26D 9/00 264/269 |
| 6,117,381 A * | 9/2000 | Cummings | ............ | B26D 11/00 264/269 |
| 6,721,060 B1 * | 4/2004 | Kawamura | ............ | B26D 1/245 358/1.3 |
| 7,703,365 B2 * | 4/2010 | Wight | ............ | B27B 5/228 83/482 |
| 8,353,234 B2 * | 1/2013 | Takama | ............ | A21C 3/10 83/130 |
| 9,314,937 B2 * | 4/2016 | Saastamo | ............ | G05B 19/19 |
| 10,882,204 B2 * | 1/2021 | Beckonert | ............ | B65H 35/02 |
| 2002/0007710 A1 * | 1/2002 | Newnes | ............ | B27B 1/007 83/508.3 |
| 2003/0066400 A1 * | 4/2003 | Noe | ............ | B23D 35/007 83/34 |
| 2004/0016334 A1 * | 1/2004 | Lindenblatt | ............ | B27B 5/185 83/508.3 |
| 2004/0149378 A1 * | 8/2004 | Cummings | ............ | B26D 9/00 156/267 |
| 2004/0168556 A1 * | 9/2004 | Noe | ............ | B23D 35/007 83/35 |
| 2006/0060044 A1 * | 3/2006 | Titz | ............ | B26D 11/00 83/13 |
| 2007/0295181 A1 * | 12/2007 | Cummings | ............ | B26D 5/02 83/407 |
| 2009/0000440 A1 * | 1/2009 | Graushar | ............ | B26D 5/20 83/52 |
| 2010/0093508 A1 * | 4/2010 | Cummings | ............ | B26D 11/00 493/366 |

FOREIGN PATENT DOCUMENTS

| | | |
|---|---|---|
| EP | 2253437 A1 | 11/2010 |
| GB | 744977 A | 2/1956 |
| GB | 2492581 A * | 9/1993 |
| KR | 101628326 B1 | 6/2016 |

* cited by examiner

SEPARATION DEVICE FOR SEPARATING A TUBULAR FLAT MATERIAL, SYSTEM AND SEPARATING METHOD

The present invention concerns a separating device for separating a tubular flat material, a system and a separating method for separating a tubular flat material.

In the production of webs of flat material, these are often first produced in the form of tubes and then the tube is separated to obtain at least two flat webs which can be wound separately from each other. An example of such a manufacturing method is film extrusion, in particular blown film extrusion. The film is first discharged from a blow head in a circular motion in at least a partially liquid state and, after a cooling phase, is fed to a feed section in a cooling region, which supports a transport movement of the film. Different systems are known to separate the film tube so that at least two flat webs are produced, which are wound separately on winding devices.

For example, it is known that the film is slit open at the sides, whereby the cut is made in one plane between the flat webs produced. It is also known that the film tube is folded and the edge regions cut off laterally. The edge strips are produced as a slight waste, so that it is guaranteed that the flat webs always have a constant width and that the edges of the flat webs are also defined by separating from above. This results in a significant increase in the quality of the flat webs.

However, this can be problematic if the tubular flat material has a strong diameter variation in the course of the method. This can occur, for example, in the blown film extrusion method, when the blown film extrusion bubble that forms behind the blow head is slightly indented due to external circumstances or varying method parameters, resulting in a short region of the tube that is not wide enough to provide a cut-off edge strip under normal operating conditions. This can result in the tubular material not being cut open in the diameter variation region and thus not being able to divide into the winding devices as intended for the flat webs. Depending in particular on random environmental conditions and method parameters, the tube can thus only be led to one winding device, while due to the preceding flat web, the second winding device is also still connected to the uncut section of the tube. This can result in confusion between the flat web and the piece of tubing, disrupting the method of producing the flat material. A machine operator must then react and cut the flat web or the piece of tube and then readjust the entire extrusion machine. During this time, however, only non-usable film material is produced, as it cannot be wound onto the winding devices. Furthermore, the operator moves inside the machine to manually reset the device.

It is therefore the object of the present invention to at least partially eliminate previous disadvantages known from the state of the art. In particular, the object of this invention is to improve the method reliability of a flat web production method from a tubular flat material in a simple and cost-effective way.

The preceding task is solved by a separator as described herein, a system as described herein and a separation method as described herein.

Further characteristics and details of the invention result from the dependent, the description and the drawings. Features and details which have been described in connection with the device for separation according to the invention naturally also apply in connection with the system according to the invention and/or the method for separation according to the invention and vice versa in each case, so that with regard to disclosure on the individual aspects of the invention, mutual reference is or can always be made.

In accordance with the invention, the separation device for separating a tubular flat material having an actual tube width has at least one longitudinal separating means for separating or severing a first edge region and a second edge region of the flat material. An auxiliary separation means is also provided, which can be brought from an auxiliary rest state to an auxiliary separation state, preferably if the actual tube width is smaller than a target tube width. The auxiliary separation means is deactivated in the auxiliary rest state and activated in the auxiliary separation state, so that in the auxiliary separation state a first and/or a second auxiliary edge region can be separated from a middle region of the flat material.

The flat material can be in particular a film material, especially preferably a plastic film material. As described in the introduction, the actual tube width of the flat material can be significantly reduced, especially in blown film extrusion, so that the separating device can improve the method reliability of the production method. In the sense of the present invention, the actual tube width can be understood as the width of the tubular flat material over which the tubular flat material spreads. The actual tube width, for example, can vary depending on the compression of the tube at a constant basic diameter of the tube. Thus, the actual tube width can preferably be a spreading width of the flat material in the region of the separating device. The first and second edge regions may also have a folding of the flat material. Thus, by separating the fold in the respective edge region by the longitudinal separation means, two flat webs can be created. In particular, the tube can be cut parallel to the flat webs in the folding method. Preferably, two flat webs can be created by separating the edge regions from the tubular flat material, since the tube between the edge regions is no longer or only partially connected. Thus, the tubular flat material can also be separated by separating off the edge regions. For example, a separation of the edge regions is a continuous separation of the edge regions, so that, for example, only a separation of the edge regions from the central area of the flat material takes place during separation, while the tube remains connected to the edge regions before passing through the longitudinal separation means. For the purposes of this invention, the central area may preferably be an area which is suitable for forming two flat webs after separating the tubular flat material. In addition, the central region can be wider than 20 mm, preferably wider than 50 mm, especially preferred wider than 100 mm transversely to a transport direction of the flat material in particular, so that the flat webs can still be reliably wound on winding devices when the flat material is separated by the auxiliary separating means. In particular, the central region is a region of the flat material which is arranged between the edge regions and/or the auxiliary edge regions. Thus, the central region can vary, in particular depending on whether the auxiliary separation means or the longitudinal separation means separates the edge regions or the auxiliary edge regions. The edge regions can thus be understood as at least partial separated from the edge regions from the tube. Separation can thus lead to the marginal regions being removable from the central region, at least in sections. The longitudinal and/or auxiliary separation means may be configured to mechanically, chemically or thermally ensure the separation of the edge regions or auxiliary edge regions. The separation of the auxiliary edge area or regions is preferably closer to the central region of the flat material than the separation of the edge regions. Thus, the separating device has the auxiliary separating means, so that the first auxiliary edge region can preferably encompass the region of the first edge region and/or the second auxiliary edge region can preferably encompass the region of the second edge region. The auxiliary separation means is deactivated in the auxiliary idle state. Deactivation of the auxiliary separation means can be understood to mean that the auxiliary separation means does not permit separation of the auxiliary edge regions or the auxiliary edge region during auxiliary rest, whereas the auxiliary separation means can ensure separation of the auxiliary edge regions at least in sections during auxiliary separation. Preferably the transfer from the auxiliary rest state to the auxiliary separation state takes place in an effective direction which is at least substantially perpendicular to the surface of the flat material. In particular, the auxiliary separating means can also be converted from the auxiliary separation state to the auxiliary resting state, for example if the actual tube width is greater than or equal to the target tube width. The target tube width can be defined as a width which is sufficient to ensure that the first and second edge regions are separated or severed, in particular without adjusting the longitudinal separating means. Thus, the target tube width can result, for example, from a distance between longitudinal separating means of the longitudinal separating means and, in particular, from an effective distance between the longitudinal separating means. In particular, the auxiliary separation means and the longitudinal separation means can be controlled together.

Preferably, in the case of a separation device in accordance with the invention, it can be provided that the auxiliary separation means can be brought from the auxiliary rest state to the auxiliary separation state if the actual tube width is smaller than a target tube width. This has already been explained above. In addition or alternatively, the auxiliary separation means can be brought from the auxiliary rest state to the auxiliary separation state if the separation of the edge regions is interrupted. In particular, a positioning of the longitudinal separating means, preferably of longitudinal separating means of the longitudinal separating means, can be monitored to determine whether they are still separating the flat material. For example, the longitudinal separating means can be spring-loaded and under certain method conditions, especially if the actual tube width is smaller than a target tube width, lose contact with the flat material. The auxiliary separation means can be brought from the auxiliary rest state to the auxiliary separation state particularly preferably if the separation of the edge regions is interrupted, if the longitudinal separation means is configured for the separation of the edge regions and, for example, the longitudinal separation means have side slitting blades.

Thus, the advantage of a separation device according to the invention is that the probability of a confusion of the winding devices for the flat material downstream of the separation device is reduced. The auxiliary separating means ensures separation of the tubular flat material even if a target tube width is not achieved and the actual tube width is therefore smaller than the target tube width. This also provides opportunities to automate the method and thereby reduce the activity of a user. Therefore, simple measures can be taken to ensure method reliability when separating the tubular flat material into flat webs. In particular, it may be sufficient, e.g. in the event of an error in the separation of the edge regions, to separate an auxiliary edge area if, for example, the edge area on the opposite side is separated without error, or if, due to a material property of the flat material, the auxiliary edge area is separated by itself.

The invention may further provide that the longitudinal separation means comprises at least two longitudinal separation means and/or that the auxiliary separation means comprises at least two auxiliary separation means, wherein the longitudinal separation means and/or the auxiliary separation means are configured to separate the flat material parallel to a transport direction of the flat material. For this purpose, the longitudinal separating means and/or the auxiliary separating means may be provided symmetrically on both sides of the flat material. Thus, the longitudinal separating means can preferably be positioned at the same height relative to each other transversely to the transport direction of the flat material. The auxiliary separating means can also advantageously be arranged at the same height relative to each other transversely to the transport direction of the flat material. This is a simple way of ensuring that the edges created when separating or severing the edge regions or auxiliary edge regions are of high quality when the flat material is severed along its transport direction. In particular, it may also be provided that the auxiliary separation means comprises only an auxiliary separation means adapted to separate the web material parallel to a transport direction of the web material, for example when only the first or second auxiliary edge region is to be separated. Preferably, both separating units, the longitudinal separating unit and the auxiliary separating means, have two separating means, the longitudinal separating means having the two longitudinal separating means and the auxiliary separating means having the two auxiliary separating means. In order to be able to produce a larger number of flat webs at the same time, the length separating means in particular can have additional length separating means. The longitudinal separating means and/or the auxiliary separating means can act particularly selectively, so that only the separating area is influenced by the separating method. The longitudinal separating means and/or the auxiliary separating means can each be arranged on two sides of the central area in order to separate the edge regions or auxiliary edge regions. Furthermore, the longitudinal separating means and/or the auxiliary separating means or the auxiliary separating means may be configured to cut the tubular flat material by laser or water jet separating. For example, a laser can be used to simultaneously thermally seal the individual edges of the resulting flat webs, as these are heated by the laser. Waterjet separating, on the other hand, is abrasive and environmentally friendly, and at the same time no further expansions, such as thermal expansions, are introduced into the flat material and thus the mechanical properties of the flat material are not or only slightly influenced. In particular, the auxiliary separating means may be centered in the auxiliary rest state of the auxiliary separating means or on the edge of the flat material, so that the flat material is not cut by the auxiliary separating means in the auxiliary rest state. One of the auxiliary separating means can also be in the center and/or another auxiliary separating means can be on the edge. If the auxiliary separating means are in the auxiliary rest state at the edge, it may be provided that they move to a first separation position transverse to the transport direction of the flat material, in particular in the direction of the central region, when transferring from the auxiliary rest state to the auxiliary separation state. The longitudinal separating means and/or the auxiliary separating means can also be provided as a structural unit. However, it is also conceivable that one of the longitudinal separating means and/or one of the auxiliary separating means may be configured separately. Thus, the longitudinal separating means and the auxiliary separating means may each have a separate structural unit on each side of the flat material, which accordingly comprises at least one longitudinal separating means and/or auxiliary separating means.

Advantageously, in the case of a separating device in accordance with the invention, it may also be provided that the longitudinal separating means and/or the auxiliary separating means are configured for stationary separating of the flat material. Stationary separating by the longitudinal separating means can be understood to mean that the longitudinal separating means do not move along a separating direction. Thus, only the flat material can move along one transport direction of the flat material and move relative to the longitudinal separating means and/or the auxiliary separating means. This means that it is not necessary to provide a drive for the longitudinal separating means and/or the auxiliary separating means in the separating direction for separating the material, so that costs can be saved here and at the same time a continuous separating method for the tubular flat material can be guaranteed. Such a continuous separating method is particularly advantageous in blown film extrusion, since it can essentially be a continuous material. Alternatively, it is conceivable that the longitudinal separating means and/or the auxiliary separating means can be actively adjusted along a separating direction. This allows a separating movement relative to the flat material to be realized, in particular independently of the movement of the flat material.

The invention may also provide that the longitudinal separating means and/or the auxiliary separating means each comprise a separating element mounted on one side. Thus, a storage of the separating element can only be mounted above the separating element. Due to a one-sided storage it is in particular not necessary to provide the separating device on both sides, e.g. above and below, of the tubular flat material, so that this can be arranged, for example, above a knife bar. The separating element may preferably be a mechanical separating element. The separating element may have a stop. For example, the separating element can include a knife blade which is configured to make a cut parallel to the transport direction of the flat material. Such a mechanical separating element offers the advantage that no further energy and no further medium is necessary, which is consumed. Thus, a separation can be realized in a simple way by means of the longitudinal separating means and/or the auxiliary separating means. Thus, the longitudinal separating means can preferably be configured as side slitting blades, which are at least essentially parallel to the flat webs of the flat material that are produced. Preferably, however, the longitudinal separating means can be aligned perpendicularly to the flat webs of the flat material, so that the edge regions can be separated. The edge strips are produced as a slight waste, so that it can be ensured that the flat webs always have a constant width, provided that the flat material has at least the target tube width and the edges of the flat webs are also defined by separating from above. This can result in an increase in the quality of the flat webs.

Advantageously, the auxiliary separating means can be adjustable between a first separating position and a second separating position with a separating device according to the invention. In particular, the auxiliary separating means may be at least substantially or completely adjustable transversely to the transport direction of the flat material. If the auxiliary separator means is moved from the auxiliary rest state to the auxiliary separator state, a separation is preferably made at the point where the auxiliary separator is positioned. However, since the latter can lie further in the center of the flat material relative to the longitudinal separating means and thus outside an edge region, so that a connection of the separating attachment with an outer edge of the tubular flat material is initially not possible, the respective auxiliary edge area continues to be connected to the tube both in the separating direction and in the opposite direction to the separating direction. If the target tube width is reached again, the longitudinal separating means can be separated again so that parallel cuts can be made, the edge regions or auxiliary edge regions of which are still connected to the tube on both sides. While the auxiliary edge region can tear depending on the method condition, this can result in a point on the longitudinal separating means which is not separated, especially if the difference between the target and actual tube width, which is taken into account by the auxiliary separating means, is very large. Adjusting the auxiliary separating means transversely to the transport direction therefore offers the advantage that the auxiliary separating means can reduce the size of the auxiliary edge region and thus the difference between the auxiliary edge region and the edge region becomes smaller, which also promotes tearing at the connection point so that the tube is no longer connected. In particular, when transferring the auxiliary separation means from the auxiliary rest state to the auxiliary separation state, a return of the auxiliary separating means in the direction of the first separation position may be provided, preferably without separating the flat material.

Preferably, in the case of a separating device according to the invention, the auxiliary separating means can be configured to be movable in at least two planes in each case, wherein the transfer from the auxiliary resting state to the auxiliary separating state can be carried out by moving the auxiliary separating means in a first plane in each case and the auxiliary separating means can be adjusted in a second plane in each case between the first separating position and the second separating position. The auxiliary separating means within the second level can preferably be moved towards and away from each other. In the first level, a parallel adjustment of the auxiliary separating means in the direction of the flat material is preferred. The auxiliary separating means can be adjusted electrically or hydraulically. However, it is particularly preferred here that the auxiliary separating means can be adjusted pneumatically, whereby pneumatics represent a particularly favorable way of centralizing pressure generation, which is necessary for pneumatic adjustment, and thus providing it outside the separation device. Therefore, it may be sufficient, for example, to connect the separating device to a pneumatic system which already exists. Thus, the auxiliary separating means can be configured as a mechanical auxiliary separating means with a separating element and by moving the blade into the flat material the auxiliary separating means can be transferred from the auxiliary resting state to the auxiliary separating state.

In the case of a separating device in accordance with the invention, it may also be provided that the auxiliary separating means in the first separating position have an effective distance from each other which is smaller than the effective distance from each other in the second separating position. An effective distance between the longitudinal separating means and the effective distance between the auxiliary separating means may be at least substantially the same if the auxiliary separating means are in the second separating position. In the context of this invention, the effective distance can preferably be understood as the distance at which the flat material is separated. Thus, the effective distance can be equal to the distance of the auxiliary or longitudinal separating means and/or equal to the distance of the separating elements. Furthermore, the effective distance can also be equal to the width of the resulting flat webs. This offers the advantage that the auxiliary separating means are perpendicular to the transport direction of the flat material at approximately the same height, so that a cut of the auxiliary separating means overlaps or essentially overlaps with a cut of the longitudinal separating means. This allows a cut-off auxiliary edge region to be combined with a cut-off edge region in such a way that the flat webs can be wound up further without any problems, without a continuous section causing confusion of the winding devices.

It is also conceivable that in the case of a separating device in accordance with the invention, the longitudinal separating means are positioned in such a way that the edge regions each have an edge width of up to 500 mm, preferably 10 to 70 mm, particularly preferably 20 to 50 mm. Such edge regions offer sufficient safety against minor variations in the diameter of the tubular flat material, which can occur, for example, due to tolerances in method parameters, whereby the auxiliary separating means are still available for larger variations.

In the case of a separation device according to the invention, it may also be provided that a separation direction of the auxiliary separation means in the first and second separation positions is oriented parallel to a separation direction of the longitudinal separation means. In particular, the auxiliary separating means may be configured in such a way that the direction of separation of the auxiliary separating means is parallel to the direction of separation of the longitudinal separating means even when the auxiliary separating means are moved from the first to the second separating position. Thus, the separations can also run parallel at least in sections, so that there is a simple possibility to unite them and also a tearing between the separations is favored, whereby the respective edge region tears off as completely as possible and thus a confusion of the winding devices is prevented.

It is further conceivable that the longitudinal separating means may be moved from a main resting state, in which the longitudinal separating means is deactivated, to a main separating state, in which the edge regions are separable or detachable by the longitudinal separating means, in the case of a separating device in accordance with the invention. In particular, the transfer of the longitudinal separating means from the main resting state to the main separating state can take place instantaneously or within 30 seconds. The two states of the longitudinal separating means make it possible, for example, to deactivate it if the actual tube width is smaller than the target tube width, so that it is also possible to reverse the transfer of the longitudinal separating means from the main separating state to the main resting state if the separation of the edge regions from the central area of the flat material is to be taken over again by the longitudinal separating means after the auxiliary separating means has separated one of the auxiliary edge regions. If the longitudinal separating means has not been deactivated beforehand, a cut by the longitudinal separating means can be unclean when the actual tube width reaches the target tube width again. For example, the film can be deflected from the longitudinal separating means so that they do not cut or hardly cut at all. An abrupt establishment of the main separation state from the main resting state of the longitudinal separating means is also advantageous here, whereby the longitudinal separating means are accelerated so that, for example, the main separation state from the main resting state is reached in less than 30 seconds, in particular in less than 5 seconds. When the main separation state is reached instantaneously, a laser can be activated, for example, so that abrupt separation of the flat material is possible. This may also favor tearing between marginal regions separated from the longitudinal separating means and auxiliary edge regions separated from the auxiliary separating means.

The invention may also provide for a receiving unit to be used to record the edge regions and/or the auxiliary edge regions. The receiving unit can ensure that the edge regions and/or the auxiliary edge regions are removed from the method in a defined manner and can, for example, be recycled. This can increase the overall method reliability, since the edge and/or auxiliary edge regions do not have any disturbing effect on the manufacturing method of the flat webs.

It is also conceivable that, in the case of a separating device according to the invention, the receiving unit comprises at least one suction means through which the edge regions and/or the auxiliary edge regions, in particular active, can be discharged. The suction medium can preferably have a blower through which the edge regions and/or the auxiliary edge regions can be actively removed. This means that the removal of edge regions and/or auxiliary edge regions from the method can be carried out reliably and, in particular, automatically. In particular, the suction medium may be configured in such a way that it is connected to the longitudinal separating means and the auxiliary separating means or that it is structurally separated from the longitudinal separating means and/or the auxiliary separating means. This can vary depending on the installation space requirements and the degree of networking to the data communication of the disconnecting device. The separating device, in particular the receiving unit, may preferably have a supply means which is configured to automatically supply the edge regions and/or auxiliary edge regions of the receiving unit. An automated gripper or a rubber roller, for example, can be provided to the receiving edge regions and/or auxiliary edge regions and supply them to the receiving unit. The supplier may be in communication with the control unit. Thus, the degree of automation of the separation device can be further increased so that costs can be saved and method reliability can be improved.

Advantageously, a sensor unit can be provided with a separating device according to the invention, through which a deviation of the actual tube width from the target tube width of—the flat material can be detected. This enables, for example, automatic activation of the auxiliary separation means. Furthermore, the sensor unit can further increase the accuracy and reactivity of the tube device, as the actual tube width can be monitored automatically. For example, a signal can be provided to warn a machine operator that an actual tube width is below a target tube width so that he can react manually. The sensor unit can, for example, be an ultrasonic sensor or a proximity sensor and operate capacitively. Preferably, however, the sensor unit is an optical sensor unit which is suitable for a wide range of materials and at the same time can have a long range, so that it is not necessary to position the sensor unit directly on the flat material. The detected deviation can be qualitative and/or quantitative. For example, it is conceivable that the sensor unit is configured to detect a difference between the target and actual tube width as an actual measurement, or that the sensor unit is configured only to determine whether flat material is present at a certain position or not. Thus, for example, the sensor unit can be arranged to monitor a region of the edge regions. If the sensor unit detects that no flat material is passing through this region, this may indicate that the target tube width has not been reached at the corresponding time.

The invention may also provide that the longitudinal separation means and/or the auxiliary separation means are subordinate to the sensor unit in relation to a transport direction of the flat material. Thus, the sensor unit can detect a deviation of the actual tube width from the target tube width before the longitudinal separating means is outside the flat material, and consequently the auxiliary separating means can be activated, in particular so that at least one separation can be made at any point along the transport direction of the flat material.

It can be advantageously provided, in the case of a separating device in accordance with the invention, that a control unit is in communication connection with the sensor unit and/or a first drive unit for driving at least one of the auxiliary separating means and/or a second drive unit for driving at least one of the longitudinal separating means, in particular so that a transfer of the auxiliary separating means from the auxiliary resting state to the auxiliary separating state and/or of the longitudinal separating means from the main resting state to the main separating state can be carried out automatically. This allows the automation of the method to be further increased, so that the reactivity of the separation device can also be further increased. Overall, this can further increase method reliability when separating the tubular flat material, since the separating device is independent of a human reaction time. The increased degree of automation can also lead to a reduction in costs. The drive units can be two structurally separate drives or, for example, assemblies or parts of a central, especially pneumatic, drive. In particular, the control unit may be configured to control the longitudinal separating means and the auxiliary separating means together, in particular the longitudinal separating means and the auxiliary separating means.

The invention may also provide that the auxiliary separation means is configured to be brought from auxiliary rest state to auxiliary separation state instantaneously or within 30 seconds. As already described within the framework of the longitudinal separating means, it is advantageous if the separation is made as quickly as possible by the auxiliary separating means, if this is required, on the one hand to ensure a tear-off of the edge regions and on the other hand to promote a clean cut. For an instantaneous change from the auxiliary rest state to the auxiliary separation state, for example, the activation of a laser can be provided, and for a sudden change from the auxiliary rest state to the auxiliary separation state, an acceleration of the auxiliary separating means can be provided, so that the auxiliary separating means of the auxiliary separation means are introduced into the flat material in less than 30 seconds, preferably in less than 5 seconds.

It is also conceivable that a separating unit, which is configured to separate through the flat material at least in sections, in particular perpendicularly to a transport direction of the flat material, is provided in a separating device in accordance with the invention. The separating unit may preferably be arranged upstream or downstream of the longitudinal separating means and/or the auxiliary separating means. If the actual tube width has been below the target tube width, it may be useful to replace the coils mounted on the coil holders of winding devices in order to start new coils by changing the coils. For example, the old winding coils may no longer be saleable if the width variation of the flat material was too high. In order to also enable sufficient speed during this changeover so that as little waste as possible is produced during the changeover, the separating unit can help to separate the flat material, in particular the flat web, in order to obtain a new starting point for a new coil. The separating unit can be configured to cut through the central region of the flat material. Furthermore, the separating unit can be used to cut through any remaining connection regions between the auxiliary edge regions and the central region and/or edge regions, especially if no cracking occurs.

In particular, it is conceivable for all the embodiments of a separating device with several auxiliary separating means described above that only one auxiliary separating means is provided instead of several auxiliary separating means, so that only one of the auxiliary edge regions can be separated by the auxiliary separating means. This can create a simple, more cost-effective configuration for certain applications.

The invention may also provide that a positioning of the auxiliary separation means is at least partially linked to a positioning of the longitudinal separation means. It is conceivable, for example, that the auxiliary separation means and the longitudinal separation means, in particular transversely to the transport direction of the flat material and/or along the transport direction of the flat material, are configured to be displaceable. The longitudinal separating means and/or the auxiliary separating means can therefore be detachable and lockable. For example, it can be advantageous to separate the flat material later or earlier in the method, depending on the type of flat material to be produced, in the direction of or against the transport direction. It is also possible to adjust the target tube width by adjusting the longitudinal separating means transversely to the transport direction of the flat material. If, for example, the auxiliary separation means is coupled to the longitudinal separation means in such a way that an adjustment of the longitudinal separation means results in a corresponding, in particular identical, adjustment of the auxiliary separation means, this facilitates the adjustment for a user, since it may not be necessary to additionally adjust the corresponding positioning of the auxiliary separation means. The coupling of the auxiliary separation means and the longitudinal separation means can be realized structurally, i.e. structurally, or control technically.

According to a further aspect of the invention, a system with a separating device according to the invention for separating a tubular flat material into at least two flat webs is claimed. At least a first winding device and a second winding device are arranged downstream of the separating device in a transport direction of the flat material, so that at least one of the flat webs can in each case be wound up by the winding devices on a winding coil which can be mounted on a winding holder of the winding device. In particular, a receiving unit, preferably having at least two receiving means, is also provided, by means of which edge regions, preferably which can be separated from a central region of the flat material by the separating device, can be removed, and/or by means of which at least one auxiliary edge region, which can be separated from a central region of the flat material by the separating device, can be removed. In particular, at least two auxiliary edge regions which can be separated from a central region of the flat material by the separating device may be removed by the receiving unit, preferably by the receiving means. Thus, a system in conformity with the invention has the same advantages as those described in detail in relation to a separation device in conformity with the invention. The separating device is preferably arranged in the region of a preference of the flat material, which directs and/or conveys the flat material to the winding devices. The receiving unit can be structurally separated from the separating device or integrated into the separating device. The subordination of the winding devices with respect to the separating device can also be understood as a subordination in the method, so that the flat material first passes through the separating device before it can be wound onto the winding devices. Preferably the separating device can in turn be arranged downstream of at least one guide means, preferably two roller-shaped guide means, so that the tubular flat material is compressed in diameter and two essentially parallel regions result from which the flat webs can be produced.

According to another aspect of the invention, a separation method is required for separating a tubular flat material. The separation method comprises the following steps:

Separation of a first and a second edge region of the flat material, in particular by a longitudinal separation means, Transferring an auxiliary separation means of a separation device, in particular a separation device in accordance with the invention, as described above, from an auxiliary rest state to an auxiliary separation state, preferably if the actual tube width is smaller than a target tube width, Separating at least one auxiliary edge region, preferably at least two auxiliary edge regions, from a central region of the flat material by the auxiliary separating means in the auxiliary separating state.

Thus, a separation method in accordance with the invention has the same advantages as those described in detail with regard to a separation device in accordance with the invention. In particular, it is a particularly simple method which is cost-effective and can be carried out with a high degree of automation. A confusion of winding devices is avoided, since a continuous separating of edge regions or auxiliary edge regions and thus a continuous formation of flat webs from a tubular flat material can be realized.

In the case of a separation method in accordance with the invention, it is also conceivable that the separation method includes the following step:

Monitoring an actual tube width of the flat material, wherein the auxiliary separation means is transferred from the auxiliary rest state to the auxiliary separation state when the actual tube width is smaller than a desired tube width. This means that if an unplanned diameter reduction of the tube occurs, this can be detected automatically and the auxiliary separation means can be used to react.

In addition or alternatively, it is conceivable that the separation method may include the following step:

Monitoring the separation status of a longitudinal separating means of the separation device, wherein the transfer of the auxiliary separation means from the auxiliary rest state to the auxiliary separation state is carried out, the separation of the edge regions of the flat material is interrupted. The monitoring of the separating status of the longitudinal separating means and the monitoring of the actual tube width can also be carried out simultaneously and together form a single step. The separating status of the longitudinal separating means can preferably be understood as a position of longitudinal separating means of the longitudinal separating means. The monitoring of the separating status of the longitudinal separating means and the transfer of the auxiliary separating means from the auxiliary rest state to the auxiliary separating state can preferably be carried out if the longitudinal separating means has longitudinal separating means in the form of side slitting blades or can otherwise disengage from the flat material independently of the tube width, so that a failure situation independent of the tube can also be reacted to.

The invention may also provide for the following step:

Adjusting auxiliary separating means of the auxiliary separating means from a first separating position into a second separating position, in particular transversely to a transport direction of the flat material, in particular wherein the auxiliary separating means is transferred into the auxiliary resting state after the auxiliary separating means have reached the second separating position.

However, the change from the auxiliary separating state to the auxiliary resting state can also take place already during the transverse adjustment, for example if the effective distance between the longitudinal separating means and the auxiliary separating means is already so small that a crack is favored and thus sufficiently probable. Thus, the auxiliary separation means can already be in the auxiliary rest state when the second separation position is reached. The transverse adjustment serves to reduce the difference between an auxiliary edge region and an edge region, so that tearing is favored here, the tube shape of the flat material is separated and thus no edge region with a circumferential edge remains, so that confusion is avoided. A change of state of the longitudinal separating means can also be carried out, whereby the longitudinal separating means can be transferred from a main separating state to a main resting state and vice versa. This has the advantages already described in connection with the separator.

According to the invention, it may also be provided that the edge regions and/or the auxiliary edge regions, in particular active, are discharged separately. This has the advantage that they can be recycled and safely removed from the method so that the edge regions do not interfere with the method. In particular, at least one edge strip winding device may be provided by means of which the edge regions and/or the auxiliary edge regions may be wound up, whereby these may be safely removed.

It is also conceivable that in a separation method in accordance with the invention, monitoring the actual tube width of the flat material comprises evaluating sensor signals. The actual tube width can be monitored optically. Thus, a high degree of automation of the method can be achieved. Optical monitoring offers the advantage that reliable monitoring of a wide variety of materials can be achieved at low cost.

It is also conceivable that the transfer of the auxiliary separation means from the auxiliary rest state to the auxiliary separation state may take place automatically. This offers the advantage that the reaction time when determining a deviation of the actual tube width from the target tube width can be defined and, in particular, reduced, so that method reliability is increased overall. Furthermore, a cost reduction is also possible here due to the increased degree of automation. Furthermore, the transfer of the longitudinal separating means from the main rest state to the main separating state and vice versa can take place automatically in order to achieve a further increased degree of automation. Alternatively, the transfer of the longitudinal separating means from the main rest state to the main separating state can be carried out manually, so that costs for an automatic drive can be saved here.

It may also be provided that in a separation method in accordance with the invention, the flat material moves relative to the separating device at least during the separation of the flat material, in particular during the entire separation method. Thus, for example, stationary auxiliary separating means and/or stationary longitudinal separating means can be provided, which can be particularly simple and cost-effective. Furthermore, a continuous cut, especially of an infinite material flow, is possible.

The invention may also provide for the continuation of the following step:

Separating of the flat material at least in sections, in particular perpendicular to a transport direction of the flat material.

For example, the center region of the flat material can be cut through. This enables to perform a coil change on a rewinder without interrupting the method for a long time, so that a saleable high-quality product can be re-set as quickly as possible and little or no waste is produced during the changeover time. Furthermore, the edge regions and/or auxiliary edge regions can also be separated transverse, e.g. to separate remaining connecting pieces.

Figure 2:
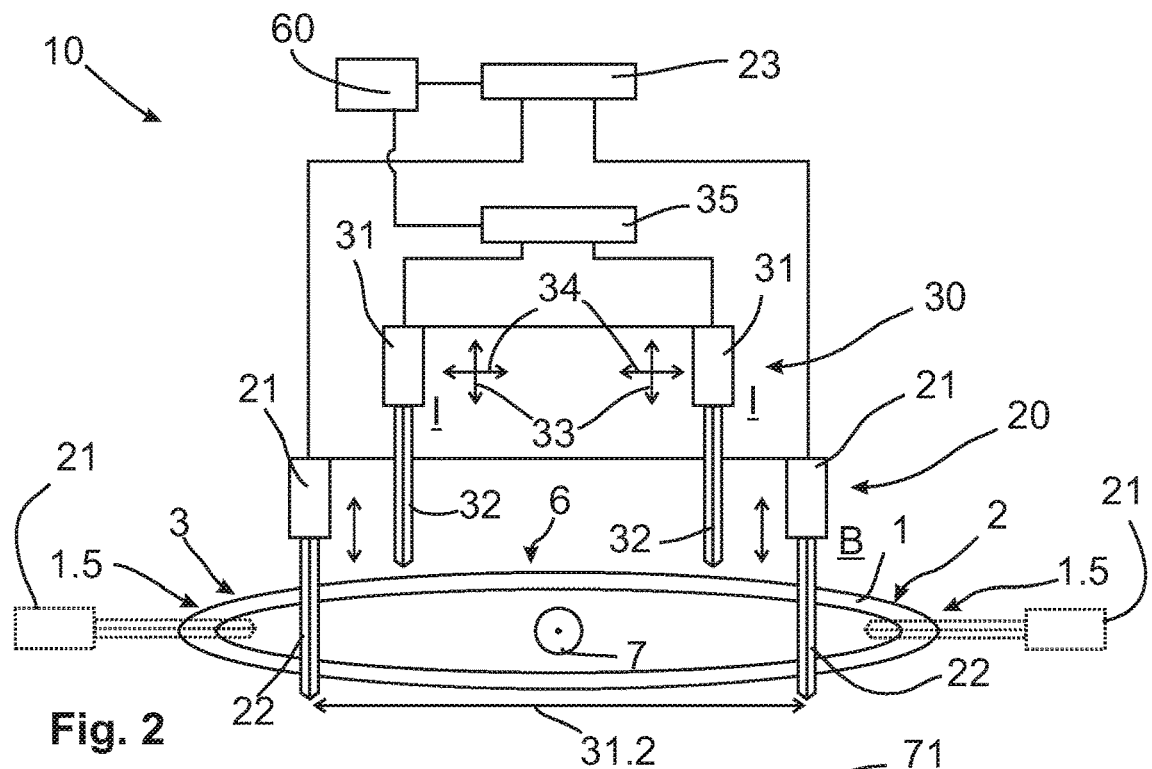
Figure 3:
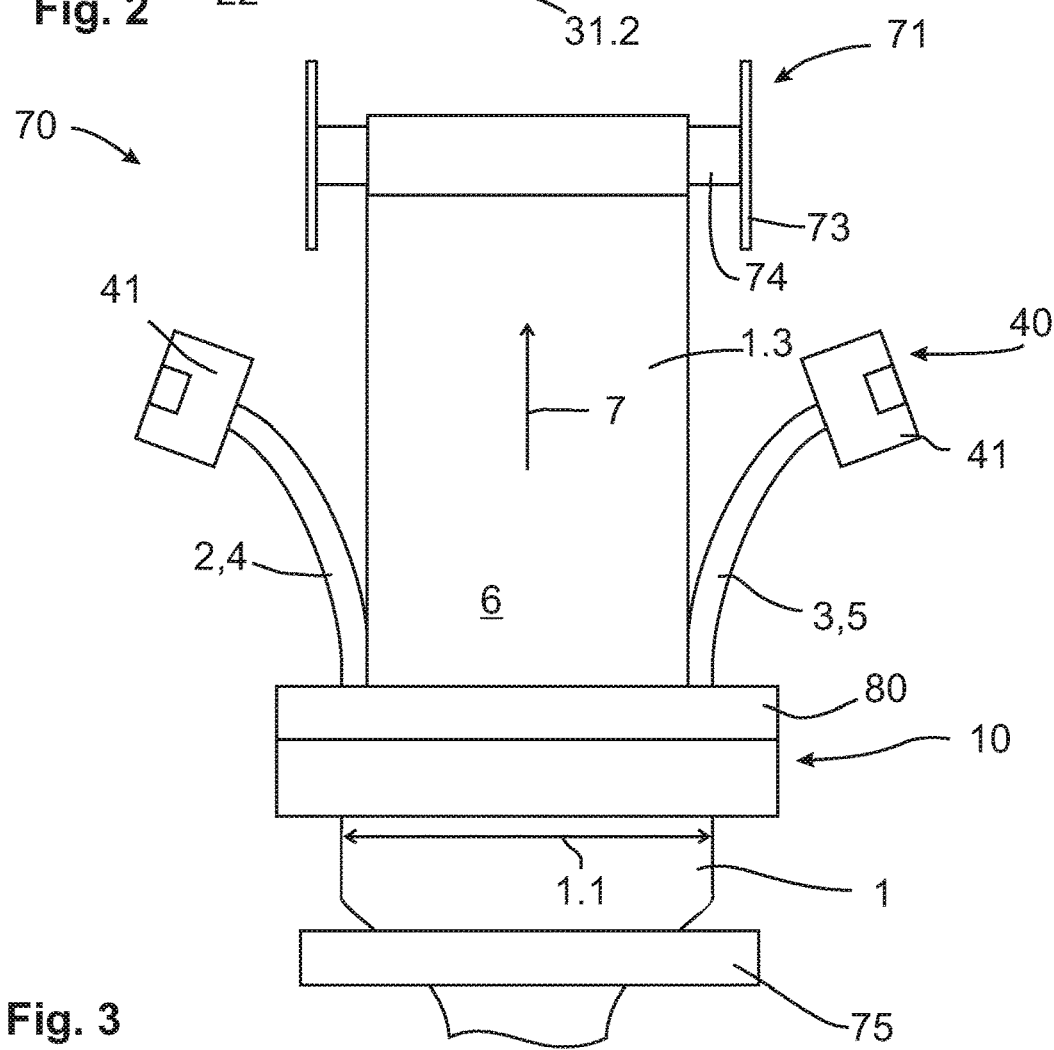
Figure 4:
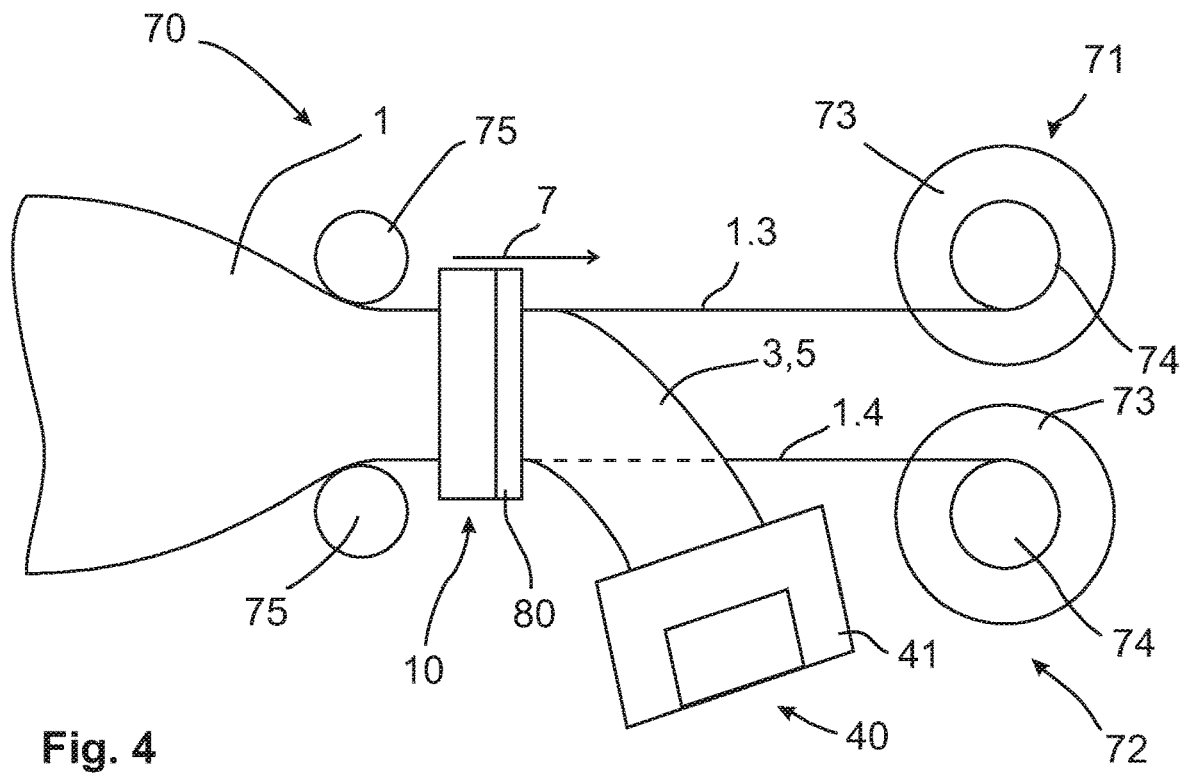
Figure 5:
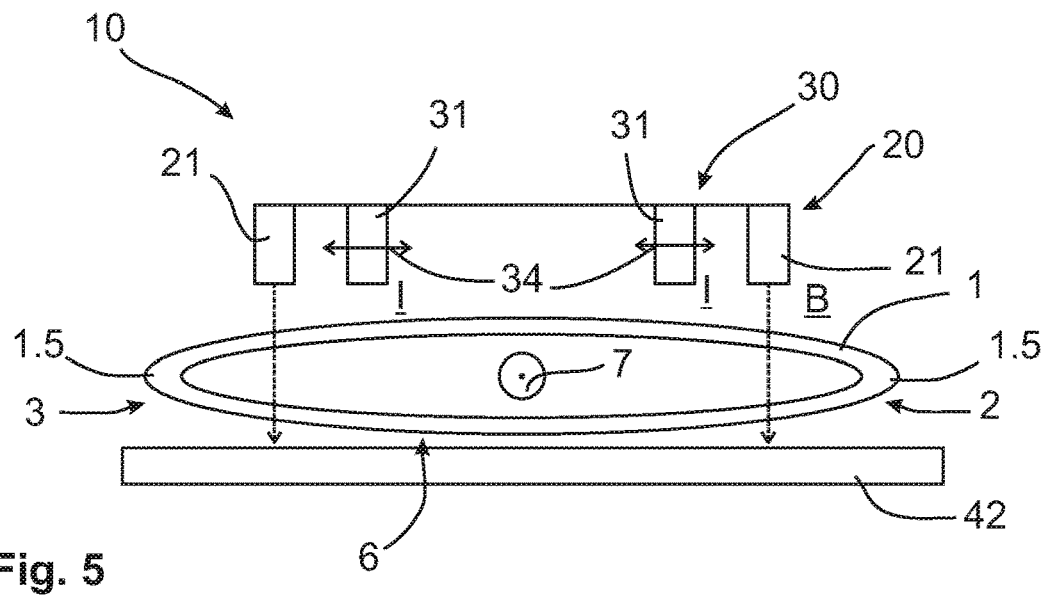
Figure 6:
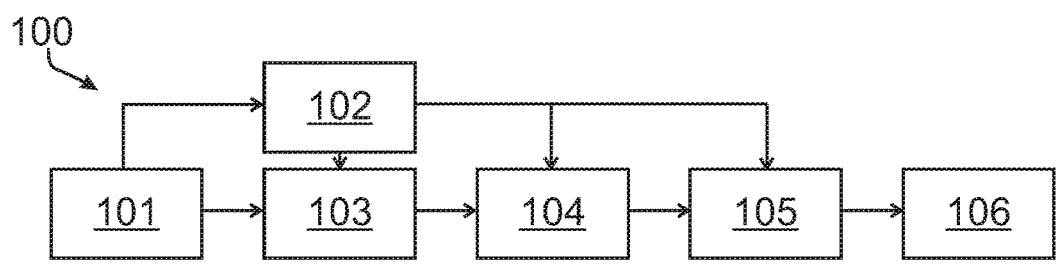
Figure 7:
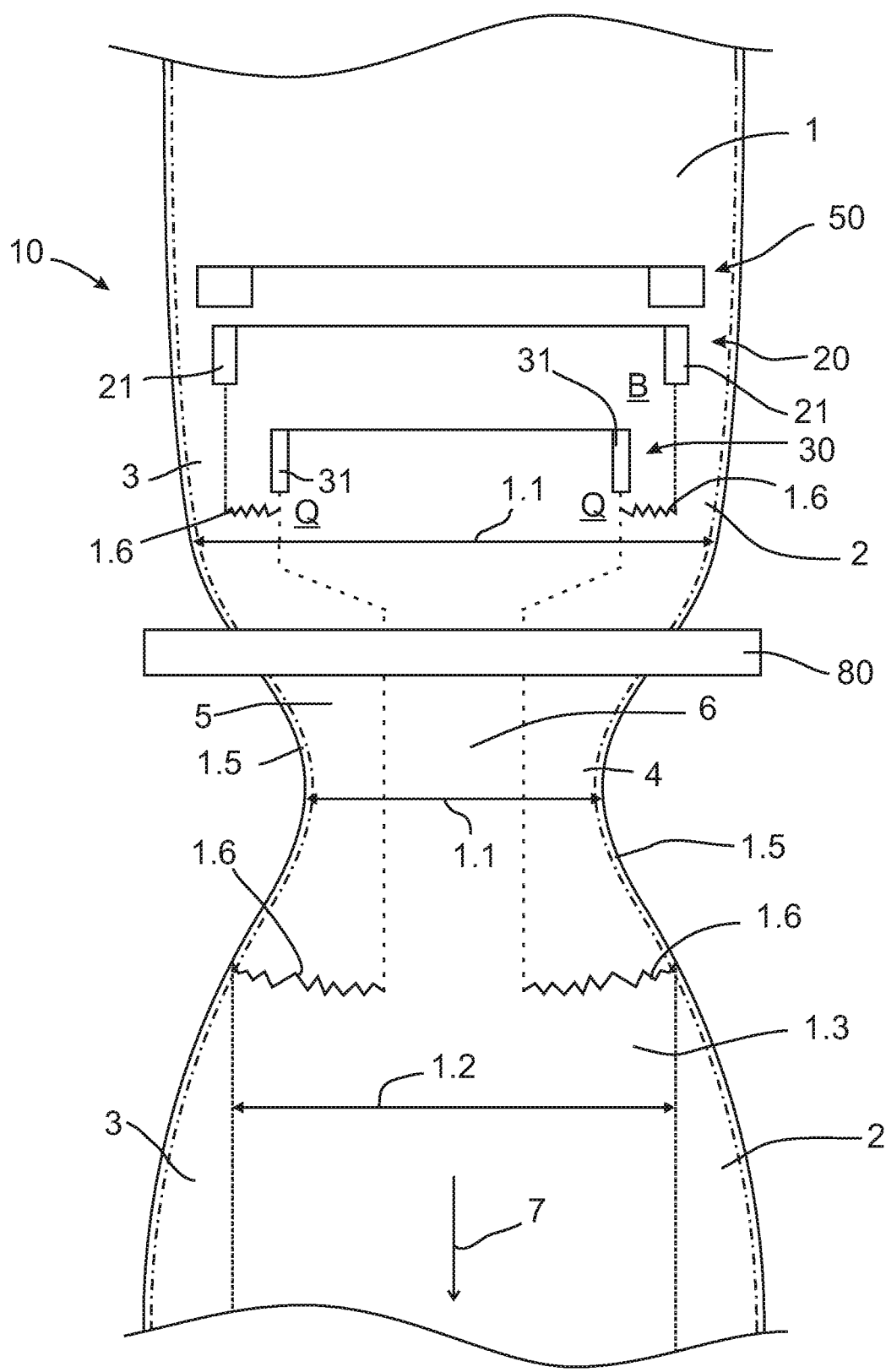

Further measures to improve the invention result from the following description of some embodiments of the invention, which are shown schematically in the figures. All features and/or advantages arising from the claims, description or drawings, including configuration details, spatial arrangements and method steps, may be essential to the invention, both in themselves and in various combinations. It should be noted that the figures are only descriptive and are not intended to restrict the invention in any way. It is shown:

FIG. 1 A separation method according to the invention with a separation device according to the invention at different points in time in a first embodiment, FIG. 2 The separating device according to the invention of the first embodiment in schematic front view, FIG. 3 A system according to the invention with a separating device according to the invention in a second embodiment, FIG. 4 The system of the second execution embodiment in schematic side view, FIG. 5 An inventive separating device in a further embodiment, FIG. 6 A separation method according to the invention in a embodiment in schematic representation, FIG. 7 A separating method in a tubular flat material with a separating device in accordance with the invention in another embodiment, In the following figures, identical reference signs are used for the same technical characteristics, even for different embodiments.

FIG. 1 shows three different times t1 to t3 of a separation method 100 according to the invention by means of a separation device 10 according to the invention in schematic plan view of a first embodiment. The separating device 10 has a length separating unit 20 for separating off a first edge region 2 and a second edge region 3. For this purpose, longitudinal separating means 21 are provided on both sides of a tubular flat material 1, which can stationarily separate a first edge region 2 and a second edge region 3 of the flat material 1 along a transport direction 7 of the flat material 1, in particular in a separating direction 24 of the longitudinal separating means 20, against which a separation is produced. The longitudinal separating means 21 are arranged at time t1 in such a way that the longitudinal separating means 20 is in the main separating state B and can separate the material. Furthermore, an auxiliary separation means 30 is provided, which is still in auxiliary rest state I at time t1 and therefore does not separate the flat material 1. If a sensor unit 50 now detects, as shown at time t1, that a target tube width 1.2 deviates from an actual tube width 1.1 of the flat material 1 or that the separating of the edge regions 2, 3 is interrupted, e.g. because a separating status of the longitudinal separating means 21 is out of action, this can be reported to a control unit 60. The actual tube width 1.1 can result, for example, from the fact that the tubular flat material 1 has collapsed in the region of its formation and thus no longer has the same propagation width as before. For example, the tube of flat material 1 may have a smaller diameter or, e.g. as a result of a malfunction, be raised in the center, so that the actual tube width 1.1 is small, at least in relation to the longitudinal separating means 20. The target tube width 1.2 can, for example, be specified by an effective distance 31.2 of the longitudinal separating means 21 or by any other effective distance at which it still makes sense to separate the edge regions 2, 3 by means of the longitudinal separating means 20. Thus at time t1 the sensor unit 50 can give the signal that the detected actual tube width 1.1 is smaller than the target tube width 1.2 or that the separation of the edge regions 2, 3 is interrupted, so that the auxiliary separation means 30 is transferred from the auxiliary rest state I, preferably within 30 s, preferably within 5 s, into an auxiliary separation state II. The auxiliary separating means 30 is activated in this case, the auxiliary separating means 31 of the auxiliary separating means 30 being moved into the flat material 1 (into the drawing plane), in particular in each case in a first plane 33, so that the auxiliary separating means 31 cut the flat material 1, in particular in a separating direction 36 of the auxiliary separating means 30 parallel to the separating direction 24 of the longitudinal separating means 20, so that a cut is produced against the separating direction 36. In addition or alternatively, it is conceivable that activating the auxiliary separating means 31 comprises activating a laser or a water jet. Furthermore, at this time t1 it may also already be provided that the longitudinal separating means 20 is transferred from the main separating state B to a main resting state A, whereby the longitudinal separating means 20 is deactivated, and the longitudinal separating means 21 correspondingly do not cut the flat material 1. Thus, according to the representation up to time t2, a first and a second auxiliary region 4, 5 are separated from a center region 6 of flat material 1. At time t2, the sensor unit 50 can also detect that the actual tube width 1.1 is again greater than or equal to the target tube width 1.2. Accordingly, there is a signal that the auxiliary separating means 31 of the auxiliary separating means 30 can be moved from a first separating position P to a second separating position Q, in particular in a second plane 34 (drawing plane). This movement takes place transversely or perpendicularly to the transport direction 7 of the flat material 1, so that in superposition with the transport movement along the transport direction 7 of the flat material 1 a cut with an angle to the transport direction 7 is produced. The adjustment between the first separating position P and the second separating position Q is configured in such a way that the auxiliary separating means 31 in the first separating position P have an effective distance 31.1 from one another which is less than the effective distance 31.1 of the auxiliary separating means 31 from one another in the second separating position Q. The effective distance 31.1 of the auxiliary separating means 31 to each other in the second separating position Q also preferably corresponds to the effective distance 31.2 of the longitudinal separating means 21 to each other. Since the separation of the longitudinal separation means 20 and the auxiliary separation means 30 is carried out parallel to one another, the first edge region 2 and a first auxiliary edge region 4 or the second edge region 3 and a second auxiliary edge region 5 are not connected, which means that at least the first auxiliary edge region and the second auxiliary edge region 4, 5 can still be connected to the tubular flat material 1 between the points in time t1 and t2. Starting in particular from a folding region 1.5, in which two flat webs 1.3, 1.4 of the tubular flat material 1 can still be connected, a crack 1.6, e.g. as a result of notching in the folding regions 1.5, will arise or spread on both sides, in particular in the course of the severing operation, in particular starting from a folding region 1.5, in which two flat webs 1.3, 1.4 of the tubular flat material 1 can still be connected, which crack 1.6 separates the first auxiliary edge region 4 or the second auxiliary edge region 5 in the lower region. In addition or alternatively, especially in the absence of crack formation, a separating unit 80 can be used to separate the remaining joint. So that the first and second auxiliary edge region 4, 5 can also be removed in the upper region, in particular after time t2, and the flat webs 1.3, 1.4 are not still connected at one point, the auxiliary separating means 31 is adjusted between the separation positions P, Q. If the auxiliary separating means 31 reaches the second separating position Q, the longitudinal separating means 20 can also be moved from the main rest state A to the main separating state B accordingly, in particular instantaneously or within 30 seconds, preferably 5 seconds, so that the longitudinal separating means 21 separate the flat material 1. Thus, the separation function of the auxiliary separation means 30 can be transferred to the longitudinal separation means 20, since the first edge region 2 and the first auxiliary edge region 4 or the second edge region 3 and the second auxiliary edge region 5 can unite. The flat webs 1.3, 1.4 are also produced here in a reliable manner so that confusion between two winding devices 71, 72 can be avoided. The separating device 10 can also have the transverse separating means 80, which is configured to separate the flat webs 1.3, 1.4 and/or the tubular flat material 1 transversely to the transport direction 7, so that the flat webs 1.3, 1.4 can be set up again for the winding devices 71, 72, so that, for example, new, unused winding coils can be fitted with the flat webs 1.3, 1.4.

FIG. 2 also shows the separation device 10 of the first embodiment in a front view. The tubular flat material 1 is transported along the transport direction 7 (out of the drawing level). The separation device 10 is shown at time t1 of FIG. 1 and the auxiliary separation means 30 is in the auxiliary rest state I. Furthermore, the auxiliary separating means 31 of the auxiliary separation means 30 are positioned in the transverse direction of the flat material 1 in accordance with the first separation position P. The auxiliary separating means 31 of the auxiliary separation means 30 are positioned in the transverse direction of the flat material 1 in accordance with the first separation position P. The auxiliary separation means 30 is in the auxiliary rest state I. The length separating unit 20, on the other hand, is in the main separating state B, so that the length separating means 21 project into the flat material 1. In addition, the longitudinal separating means 21 as well as the auxiliary separating means 31 have separating elements 22, 32, which are configured to cut the flat material 1 stationary. The separating elements 22, 32 are preferably configured as mechanical separating elements, in particular as blades. The blades are mounted on one side, so that the longitudinal separating means 20 can be arranged e.g. above (shown as a full line) or laterally (dashed) and the auxiliary separating means 30 can be arranged above the flat material 1 and also a first drive unit 35 of the auxiliary separating means 30 and a second drive unit 23 of the longitudinal separating means 20 can be arranged on one side of the flat material 1. The drive units 23, 35 can preferably be provided as pneumatic drives, so that these can be provided centrally or decentrally as a respective part of the longitudinal separating means 20 or the auxiliary separating means 30. The drive units 23, 35 may also preferably be connected to a control unit 60, so that it can preferably automatically change the state of the longitudinal separating means 20 and/or the auxiliary separating means 30 or change the position of the auxiliary separating means 30 on the basis of signals from the sensor unit 50. Due to the configuration using separating elements 22, 32, the auxiliary separating means 30 in auxiliary separating state II and the longitudinal separating means 20 in main separating state B can cut the tubular flat material 1 parallel to the transport 5 direction 7 of the flat material 1 and remain stationary. In particular, for certain applications, for example, it may be provided that the auxiliary separation means 30 has only one auxiliary separating means 31, so that only one of the auxiliary separation ranges 4, 5 is separable or will be separated.

FIGS. 3 and 4 show a System 70 with a separation device 10 according to the invention in a second embodiment, where FIG. 3 shows system 70 in schematic plan view and FIG. 4 shows system 70 in schematic side view. A tubular flat material 1 is moved along a transport direction 7 so that it passes the separating device 10. The separating device 10 is arranged after at least one guide means 75, preferably two roller-shaped guide means 75. The tubular flat material 1 is compressed in at least one direction by the guide means 75, so that between two folding regions two essentially parallel regions result which can be processed into flat webs 1.3, 1.4. The separating device 10 separates the tubular flat material 1 into two flat webs 1.3, 1.4, whereby a first and a second edge region 2, 3 are separated from the flat material 1 by the separating device 10. If the tubular flat material 1 has an actual tube width 1.1 which is greater than or equal to a target tube width 1.2. If the actual tube width 1.1 is smaller than the target tube width 1.2, a first auxiliary edge region 4 and a second auxiliary edge region 5 can be detached from a central region 6 of the tubular shed material 1 instead of the edge regions 2 and 3, so that the central region 6 then forms the flat webs 1.3 and 1.4. This allows the flat webs 1.3, 1.4 to be wound separately onto one winding device 71, 72 each. The first and second winding devices 71, 72 each have a winding holder 73, on which a winding coil 74 can be placed, on which one of the flat webs 1.3, 1.4 can be wound. It becomes clear here that if the flat webs 1.3, 1.4 are connected together, for example if the actual tube width 1.1 is smaller than a target tube width 1.2 without separation by the auxiliary separating means 30 of the separating device 10, confusion would arise between the winding devices 71, 72, as both winding devices 71, 72 would attempt to wind tubular flat material 1 on the respective winding reel 74. In order to simplify, for example, a roll change of the winding rolls 74 of the winding devices 71, 72, a separating unit 80 is also provided in order to enable simple separating of the flat webs 1.3, 1.4. In order to remove the edge regions 2, 3 or the auxiliary edge regions 4, 5 from the method, a receiving unit 40 can also be provided, which can be structurally separated from the separating device 10 or which can be connected to the separating device 10. Thus, the receiving unit 40 can comprise at least two suction means 41 to take up the edge regions 2, 3 or the auxiliary edge regions 4, 5 on each side of the flat webs 1.3, 1.4. The suction medium 41 can, for example, have a blower which actively extracts the edge regions 2,3 or the auxiliary edge regions 4,5. The receiving unit 40 can preferably be omitted if longitudinal separating means 21 of a longitudinal separating means 20 of the separating device 10 are configured as side slicing blades for separating the edge regions 2,3.

FIG. 5 also shows an inventive separating device 10 in another embodiment. In particular, the separating device 10 is essentially configured according to the first embodiment. For example, the separating device 10 has a longitudinal separating means 20 and an auxiliary separating means 30. The auxiliary separation means 30 is deactivated at the time shown and thus in an auxiliary rest state I, while the longitudinal separation means 20 is activated and thus in a main separation state B. The auxiliary separation means 30 is deactivated at the time shown and thus in an auxiliary rest state I, while the longitudinal separation means 20 is activated and thus in a main separation state B. The auxiliary separation means 30 is in a main separation state B. Instead of showing blades, longitudinal separating means 21 of the longitudinal separating means 30 of the design embodiment of FIG. 5 in the main separating state B emit a laser beam or a water jet to cut off edge regions 2, 3 of the tubular flat material. The longitudinal separating means 30 is stationary, since the tubular flat material 1 moves along a transport direction 7 through the separating unit 10. In the case of a separating by water jet separating, a drainage device 42 may also be provided which can drain used medium, such as water. Preferably the drainage device 42 is arranged below the tubular flat material 1. The auxiliary separation means 30 is also provided in the auxiliary rest state I in such a way that the laser or water jet is not active or cuts during deactivation, so that auxiliary separating means 31 of the auxiliary separation means 30 does not cut the tubular flat material 1. Due to the configuration without a mechanical separating element, it is not necessary to adjust the longitudinal separating means 21 and/or the auxiliary separating means 31 in the direction of the flat material 1 so that these can be in a fixed position. Preferably the auxiliary separating means 31 can only be configured to be adjustable in a transverse direction to the flat material 1 or to the transport direction 7 of the flat material 1, preferably in a second plane 34. In particular, the longitudinal separating means 20 and the auxiliary separating means 30 may be provided at the same height.

FIG. 6 also shows a separation method 100 in accordance with the invention in a schematic representation of the method steps. First of all, a separation of a first and a second edge region 2, 3 of a tubular flat material 1 is provided according to a method step 101. This can preferably be done by a length separating means 20 of a separating device 10. During separation method 100, an actual tube width 1.1 of the flat material 1 is monitored in accordance with method step 102. In addition or alternatively, method step 102 can include monitoring the separation status of the length separation means 20. This 5 can preferably be done by a sensor unit 50 of the separating device 10. If it is determined that the actual tube width 1.1 is smaller than a target tube width 1.2 of the flat material 1, the auxiliary separation means 30 is transferred from an auxiliary rest state I to an auxiliary separation state II according to method step 103. In addition or alternatively it can be determined by the sensor unit 50 or a further sensor unit that the separation of the edge regions 2,3 is interrupted, so that in the context of method step 103 the auxiliary separation means 30 is transferred from the auxiliary rest state I to the auxiliary separation state II. Then, according to a method step 104, auxiliary edge regions 4, 5 can be separated from a central region 6 of flat material 1 by the auxiliary separation means 12 in auxiliary separation state II according to a method step 104. A union of the auxiliary edge regions 4, 5 with the respective edge regions 2, 3 can take place for example by a crack propagation, so that the auxiliary edge regions 4, 5 do not have to be united actively with the edge regions 2, 3. Preferably, however, a method step 105 may also be provided, after which auxiliary separating means 31 of the auxiliary separating means 30 are moved from a first separating position P to a second separating position Q, the auxiliary separating means 31 being detected transversely to a transport direction 7 of the flat material 1. Thus, the edge regions 2, 3 are at least partially or completely united with the respective auxiliary edge regions 4, 5. If the edge regions 2, 3 are only partially combined with the auxiliary edge regions 4, 5, the complete combination can also take place, for example, by crack propagation. Therefore, it is particularly advantageous if the auxiliary separation means 30 is only transferred to the auxiliary rest state I after the auxiliary separating means 31 have reached the second separation position Q. Thus, at least for a short time, the auxiliary separating means 31 and the longitudinal separating means 21 can separate the flat material 1 parallel and close to each other, so that the cuts either merge into each other or are united by crack propagation.

In order to facilitate a change of a winding coil 74 of a winding device 71, 72, a transverse separating means 80 may also be provided, which can cut flat webs 1.3, 1.4 or the tubular flat material 1 in accordance with a method step 106, for example by means of a knife adjustable in transverse direction to the transport direction 7 of the flat material 1.

FIG. 7 also shows a separating device 10 in accordance with the invention on a flat material 1 with a transport direction 7. The flat material 1 is tubular and therefore has a folding region 1.5 on the sides, at which the flat material 1 is turned over. Folding region 1.5 may have a sharp-edged fold or a soft curve. It is further shown that the tubular flat material 1 in the lower region is divided into flat webs 1.3, 1.4 in that a cut is made by a longitudinal separating means 20 of the separating device 10, so that a first edge region 2 and a second edge region 3 are formed, which contain the folding region 1.5, so that the flat webs 1.3, 1.4 are formed between the first and second edge regions 2, 3. Flat material 1 also has an region in which an actual tube width 1.1 is smaller than a target tube width 1.2 of flat material 1, so that in this region an auxiliary separation means 30 has introduced two auxiliary edge regions 4, 5. For this purpose, the auxiliary separation means 30 made one cut each by means of two auxiliary separating means 31. However, since the first auxiliary edge region 4 and the second auxiliary edge region 5 are still connected in the lower region with the flat webs 1.3, 1.4, a crack 1.6 has been created on both sides, which ensures that the auxiliary edge regions 4, 5 can also be separated from a center region 6 in the region of a smaller actual tube width. In the upper region, the union of the auxiliary edge regions 4, 5 with the edge regions 2, 3 is further supported by the fact that auxiliary separating means 31 are configured to be adjustable transversely to the transport direction 7 of the flat material 1 so that they are adjustable between a first separating position P and a second separating position Q in the direction of the respective longitudinal separating means 21. In the embodiment shown here, the second separating position Q of the auxiliary separating means 31 is further away from the folding region 1.5 of the tubular flat material 1 than the position of longitudinal separating means 21. However, crack formation is also supported here, so that a crack 1.6 can unite the upper first edge region 2 with the first auxiliary edge region 4 and the upper second edge region 3 with the second auxiliary edge region 5. This means that it can be ensured continuously that two flat webs 1.3, 1.4 are produced without confusion arising from the separation device 10 downstream winding devices 71, 72.

As shown in FIG. 2 (dashed lines), the longitudinal separation means 20, in particular in the preceding embodiments, may be configured to separate the edge regions 2,3 of the flat material 1 and in particular not to separate them. The longitudinal separating means 21 of the longitudinal separating means 20 can be arranged on the side of the flat material 1 and can, for example, be configured as side slitting blades. This results in the folding region 1.5 being cut open so that two flat webs 1.3, 1.4 are created without the edge regions 2, 3 being separated by the longitudinal separation means 20.

Furthermore, it is conceivable with the above configurations that only an auxiliary edge region 4, 5 can be separated or will be separated by the auxiliary separation means 30. In particular, it may be sufficient to separate an auxiliary edge region 4, 5 if, for example, the edge region 3, 2 is separated without error on the opposite side, or if, due to a material property of the flat material 1, the auxiliary edge region 4, 5 is separated by itself, it may be sufficient to separate an auxiliary edge region 4, 5 if, for example, the edge region 2, 3 is separated or separated by a defect. It may therefore also be provided that the auxiliary separator means 30 comprises only one auxiliary separator 31.

The preceding explanation of the forms of execution describes the present invention exclusively in the context of embodiments. Of course, individual features of the configuration can be freely combined with each other without leaving the scope of the present invention, provided that this is technically feasible.

REFERENCE CHARACTER LIST

1 Flat material
1.1 Actual tube width
1.2 Target tube width
1.3 First flat track
1.4 Second flat track
1.5 Folding range
1.6 Crack
2 First edge region
2.1 Edge width
3 Second edge region
4 First auxiliary edge region
5 Second auxiliary edge region
6 Center range
7 Transport direction
10 Separating device
20 Longitudinal separating means
21 Longitudinal separating means
22 Separating element
23 Second drive unit
24 Separation direction
30 Auxiliary separation means
31 Auxiliary separating means
31.1 Effective distance
31.2 Effective distance
32 Separating element
33 Plane
34 Second plane
35 First drive unit
36 Separation direction
40 Receiving unit
41 Suction means
42 Drainage device
50 Sensor unit
60 Control unit
70 System
71 First winding device
72 Second winding device
73 Coil holder
74 Coil
75 Guidance means
80 C-separation unit
100 method
101 Method step
102 Method step
103 Method step
104 Method step
105 Method step
106 Method step
A main resting state
B Main separation state
P 1st separation position
Q 2nd separation position
I Auxiliary resting condition
II Auxiliary separation state
tn Method time

The invention claimed is:

1. A separating device for separating a tubular flat material having an actual tube width, comprising:
at least one longitudinal separation device for separating or severing a first edge region and a second edge region of the flat material,
wherein
an auxiliary separation device is provided which can be brought from an auxiliary rest state into an auxiliary separation state, the auxiliary separation device being deactivated in the auxiliary rest state and being activated in the auxiliary separation state, wherein the auxiliary separation device has at least two auxiliary separation components which are configured to separate a first auxiliary edge region, which includes the first edge region, and a second auxiliary edge region, which includes the second edge region, from a center region of the flat material in the auxiliary separation state, the center region being arranged between the first edge region and the second edge region of the flat material,
wherein a sensor device is provided being configured to generate signals depending on a deviation of the actual tube width from a target tube width of the flat material,
wherein a first drive device is provided which is configured to bring the auxiliary separation components from the auxiliary rest state into the auxiliary separation state at least if the actual tube width is smaller than the target tube width or if the separation of the edge regions is interrupted, and
wherein a control device is provided and in communication connection with the sensor device and the first drive device, the control device being configured to control the first drive device to automatically and laterally move the auxiliary separation components from a position out of the flat material into the flat material on the basis of the signals from the sensor device received over the communication connection, in order to change the state of the auxiliary separation components from the auxiliary rest state to the auxiliary separation state,
wherein the auxiliary separation device is arranged downstream of the sensor device with respect to a transport direction of the flat material.

2. The separating device according to claim 1,
wherein
the longitudinal separation device has at least two longitudinal separation components, at least the longitudinal separation device or the auxiliary separation device being configured to separate the flat material parallel to the transport direction of the flat material.

3. The separating device according to claim 2,
wherein
at least the longitudinal separation device or the auxiliary separation device are configured for stationary separating of the flat material.

4. The separating device according to claim 3,
wherein
at least one of the longitudinal separation device and the auxiliary separation device comprises a separating element which is mounted on one side.

5. The separating device according to claim 2,
wherein
the longitudinal separation components are separated from each other by an effective distance such that the edge regions each have an edge width ranging from greater than 0 mm to 500 mm.

6. The separating device according to claim 2,
wherein
the control device is in communication connection with a second drive device for driving at least one of the longitudinal separation components.

7. The separating device according to claim 1,
wherein
the auxiliary separation components are adjustable between a first separating position and a second separating position.

8. The separating device according to claim 7,
wherein
the auxiliary separation components are each configured to be movable in at least two planes, the transfer from the auxiliary rest state to the auxiliary separation state being able to be carried out by moving the auxiliary separation components in a first plane, and the auxiliary separation components being adjustable between the first separating position and the second separating position in a second plane.

9. The separating device according to claim 8,
wherein
in the first separating position, the auxiliary separation components have an effective distance from one another which is smaller than the effective distance from one another in the second separating position.

10. The separating device according to claim 7,
wherein
a separating direction of the auxiliary separation device is oriented in the first and second separating positions parallel to a separating direction of the longitudinal separation device.

11. The separating device according to claim 1,
wherein
the longitudinal separation device can be moved from a main resting state, in which the longitudinal separation device is deactivated, to a main separation state, in which the edge regions can be separated by the longitudinal separation device.

12. The separating device according to claim 1,
wherein
a receiving device is provided, by means of which at least the edge regions or the auxiliary edge regions can be received.

13. The separating device according to claim 12,
wherein
the receiving device comprises at least one suction component through which at least the edge regions or the auxiliary edge regions, can be actively discharged.

14. The separating device according to claim 1,
wherein
the auxiliary separation device is configured to be brought within 30 seconds from the auxiliary rest state into the auxiliary separation state.

15. The separating device according to claim 1,
wherein
a transverse separating component is provided which is configured to cut through the flat material at least in sections, in particular perpendicularly to the transport direction of the flat material.

16. The separating device according to claim 1,
wherein
positioning of the auxiliary separation device is at least partially coupled to positioning of the longitudinal separation device.

17. A system with a separating device for separating a tubular flat material having an actual tube width, with at least one longitudinal separation device for separating or severing a first edge region and a second edge region of the flat material, wherein an auxiliary separation device is provided which can be brought from an auxiliary rest state into an auxiliary separation state, the auxiliary separation device being deactivated in the auxiliary rest state and being activated in the auxiliary separation state, wherein the auxiliary separation device has at least two auxiliary separation components which are configured to separate a first auxiliary edge region, which includes the first edge region, and a second auxiliary edge region, which includes the second edge region, from a center region of the flat material in the auxiliary separation state, the center region being arranged between the first edge region and the second edge region of the flat material, for separating a tubular flat material into at least two flat webs, at least a first winding device and a second winding device being arranged downstream of the separating device in a transport direction of the flat material, so that at least one of the flat webs can be wound on a winding coil, which can be mounted on a winding holder of the winding devices,
wherein a sensor device is provided being configured to generate signals depending on a deviation of the actual tube width from a target tube width of the flat material,
wherein a first drive device is provided which is configured to bring the auxiliary separation components from the auxiliary rest state into the auxiliary separation state at least if the actual tube width is smaller than the target tube width or if the separation of the edge regions is interrupted, and
wherein a control device is provided and in communication connection with the sensor device and the first drive device, the control device being configured to control the first drive device to automatically and laterally move the auxiliary separation components from a position out of the flat material into the flat material on the basis of the signals from the sensor device received over the communication connection, in order to change the state of the auxiliary separation components from the auxiliary rest state to the auxiliary separation state, wherein the auxiliary separation device is arranged downstream of the sensor device with respect to a transport direction of the flat material.

\* \* \* \* \*